United States Patent
Cao et al.

(10) Patent No.: US 9,743,160 B2
(45) Date of Patent: Aug. 22, 2017

(54) MEMORY ACCESS SYSTEM, APPARATUS, AND METHOD

(71) Applicant: Huawei Technologies Co., Ltd., Shenzhen (CN)

(72) Inventors: Tongtong Cao, Beijing (CN); Liyao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/291,232

(22) Filed: Oct. 12, 2016

(65) Prior Publication Data

US 2017/0034603 A1 Feb. 2, 2017

Related U.S. Application Data

(63) Continuation of application No. PCT/CN2014/080893, filed on Jun. 26, 2014.

(51) Int. Cl.
*H04J 14/00* (2006.01)
*H04Q 11/00* (2006.01)
(Continued)

(52) U.S. Cl.
CPC ....... *H04Q 11/0005* (2013.01); *H04B 10/506* (2013.01); *H04J 14/02* (2013.01);
(Continued)

(58) Field of Classification Search
CPC ......... H04Q 11/0005; H04Q 2011/005; H04Q 2011/0016; H04Q 2011/0039;
(Continued)

(56) References Cited

U.S. PATENT DOCUMENTS

| | | | |
|---|---|---|---|
| 5,005,166 A * | 4/1991 | Suzuki | H04J 14/00 398/47 |
| 5,349,653 A * | 9/1994 | Kurokawa | H03M 9/00 341/101 |

(Continued)

FOREIGN PATENT DOCUMENTS

| | | |
|---|---|---|
| CN | 1498476 A | 5/2004 |
| CN | 1578948 A | 2/2005 |
| CN | 102361467 A | 2/2012 |

OTHER PUBLICATIONS

Chakraborty, A., et al., "Switching Optically-Connected Memories in a Large-Scale System," IEEE 26th International Parallel and Distributed Processing Symposium, May 21-25, 2012, pp. 727-738.

(Continued)

*Primary Examiner* — Li Liu
(74) *Attorney, Agent, or Firm* — Conley Rose, P.C.

(57) ABSTRACT

A memory access system that includes a data sending apparatus, an optical transmission medium, and a data receiving apparatus. The data sending apparatus includes a signal generator, an optical switch, and an optical modulator. The signal generator controls the optical switch to output the optical wave of the wavelength corresponding to the target memory, and the optical wave carries an electrical signal corresponding to an access request, so that an optical signal carrying the access request is directly transmitted from the optical transmission medium to the data receiving apparatus without passing through the optical switch anymore, which avoids noise interference generated when the optical signal passes through the optical switch.

21 Claims, 8 Drawing Sheets

(51) Int. Cl.
*H04J 14/02* (2006.01)
*H04B 10/50* (2013.01)

(52) U.S. Cl.
CPC ...... *H04J 14/0205* (2013.01); *H04J 14/0241* (2013.01); *H04J 14/0256* (2013.01); *H04J 14/0272* (2013.01); *H04J 14/0279* (2013.01); *H04Q 2011/005* (2013.01); *H04Q 2011/0016* (2013.01); *H04Q 2011/0039* (2013.01); *H04Q 2011/0041* (2013.01); *H04Q 2011/0052* (2013.01)

(58) Field of Classification Search
CPC ........... H04Q 2011/0041; H04B 10/506; H04J 14/0205; H04J 14/0241; H04J 14/0279
USPC .................................. 398/45, 48–50, 79, 82
See application file for complete search history.

(56) References Cited

U.S. PATENT DOCUMENTS

| | | | | |
|---|---|---|---|---|
| 5,754,320 | A * | 5/1998 | Watanabe | H04Q 11/0005 385/17 |
| 6,335,992 | B1 * | 1/2002 | Bala | H04Q 11/0005 385/16 |
| 6,542,655 | B1 * | 4/2003 | Dragone | H04Q 11/0005 385/17 |
| 8,606,102 | B2 | 12/2013 | Lee et al. | |
| 8,965,212 | B2 | 2/2015 | Morris et al. | |
| 2002/0021464 | A1 * | 2/2002 | Way | H04B 10/50 398/79 |
| 2002/0089720 | A1 * | 7/2002 | Steinberg | H04J 14/02 398/82 |
| 2003/0043426 | A1 | 3/2003 | Baker et al. | |
| 2004/0091199 | A1 * | 5/2004 | Goodfellow | H04B 10/505 385/16 |
| 2005/0095000 | A1 | 5/2005 | Decusatis et al. | |
| 2009/0238565 | A1 | 9/2009 | Graves et al. | |
| 2012/0033978 | A1 | 2/2012 | Morris et al. | |
| 2013/0051798 | A1 * | 2/2013 | Chen | H04Q 11/0005 398/49 |
| 2016/0172020 | A1 | 6/2016 | Baker et al. | |

OTHER PUBLICATIONS

Foreign Communication From a Counterpart Application, PCT Application No. PCT/CN2014/080893, English Translation of International Search Report dated Mar. 25, 2015, 2 pages.
Foreign Communication From a Counterpart Application, PCT Application No. PCT/CN2014/080893, English Translation of Written Opinion dated Mar. 25, 2015, 15 pages.
Foreign Communication From a Counterpart Application, PCT Application No. PCT/CN2014/080893, International Search Report dated Mar. 25, 2015, 4 pages.
Foreign Communication From a Counterpart Application, PCT Application No. PCT/CN2014/080893, Written Opinion dated Mar. 25, 2015, 6 pages.

* cited by examiner

MEMORY ACCESS SYSTEM, APPARATUS, AND METHOD

CROSS-REFERENCE TO RELATED APPLICATIONS

This application is a continuation of International Application No. PCT/CN2014/080893, filed on Jun. 26, 2014, which is hereby incorporated by reference in its entirety.

TECHNICAL FIELD

The present disclosure relates to the field of computer technologies, and in particular, to a memory access system, apparatus, and method.

BACKGROUND

The rapid development of the information technology continuously raises a higher requirement for a computing capability of a computer system, and a large-capacity and high-bandwidth access memory is urgently needed to match a high-speed processing capability of a processor. An optical interconnection technology has advantages such as high transmission bandwidth, a low transmission loss, and low power consumption. In recent years, it has become a research hotspot in the industry to use the optical interconnection technology to implement an interconnection between chips. A multi-processor system is a computer system including multiple processors and multiple memories. The optical interconnection technology is introduced to the multi-processor system to implement dynamic access, based on the optical interconnection technology, to the multiple memories by the multiple processors, which can significantly improve a data processing capability of the system.

In the prior art, dynamic access to the multiple memories of the multi-processor system can be performed based on an optical route and switch technology. In a manner of performing route selection for a modulated signal sent by a processor, a route of an optical signal is controlled, implementing that the processor accesses a corresponding target memory. In this method, because the modulated optical signal sent by the processor is affected by noise when passing through an optical switch, a signal-to-noise ratio of the signal is reduced, and link signal integrity cannot be ensured.

SUMMARY

An objective of the present disclosure is to provide a memory access system, apparatus, and method, which are used to eliminate, at the same time of implementing dynamic memory access by a processor, noise interference generated when a modulated optical signal sent by the processor passes through an optical switch.

According to a first aspect, an embodiment of the present disclosure provides a memory access system, including a data sending apparatus, an optical transmission medium, and a data receiving apparatus, where the data sending apparatus includes a signal generator, an optical switch, and an optical modulator, and the data receiving apparatus includes a demultiplexer, multiple memories, and optical receivers corresponding to the multiple memories in a one-to-one manner; an electrical input end of the optical switch is connected to the signal generator, an optical input end of the optical switch is connected to a multi-wavelength light source and receives an optical wave emitted by the multi-wavelength light source, an output end of the optical switch is connected to an optical input end of the optical modulator, and the signal generator is connected to a signal input end of the optical modulator; an input end of the demultiplexer of the data receiving apparatus is connected to the optical modulator of the data sending apparatus using the optical transmission medium, and an output end of the demultiplexer of the data receiving apparatus is connected to the optical receivers; the signal generator is configured to send an electrical signal to the optical modulator, where the electrical signal carries an access request for a target memory; and control, according to a preset correspondence between a memory identifier and an optical wavelength, the optical switch to output an optical wave of a wavelength corresponding to the target memory to the optical modulator; the optical modulator is configured to receive the optical wave sent by the optical switch; receive the electrical signal input by the signal generator; use the electrical signal to modulate the optical wave, so that the electrical signal is loaded to the optical wave to form an optical signal; and send, using the optical transmission medium, the optical signal to the data receiving apparatus in which the target memory is located; the demultiplexer is configured to receive the optical signal using the optical transmission medium; and send, according to the preset correspondence between a memory identifier and an optical wavelength, a demultiplexed optical signal to an optical receiver corresponding to the target memory; and the optical receiver is configured to convert the received optical signal into an electrical signal; and send the electrical signal to the target memory.

In a first possible implementation manner of the first aspect, the signal generator includes a processor and a controller, the processor is separately connected to the optical modulator and the controller, and the controller is connected to the electrical input end of the optical switch, where the processor is configured to send a first control signal to the controller, where the first control signal carries an identifier of the target memory that is to be accessed by the processor; and send the electrical signal to the optical modulator; and the controller is configured to receive the first control signal; determine, according to the preset correspondence between a memory identifier and an optical wavelength, the wavelength corresponding to the target memory; and control the optical switch to output the optical wave of the wavelength corresponding to the target memory to the optical modulator.

In a second possible implementation manner of the first aspect, the signal generator includes a processor and a controller, the processor is separately connected to the optical modulator and the controller, and the controller is connected to the electrical input end of the optical switch, where the processor is configured to search for, according to the preset correspondence between a memory identifier and an optical wavelength, the wavelength corresponding to the target memory; send a second control signal to the controller, where the second control signal carries the wavelength corresponding to the target memory; and send the electrical signal to the optical modulator; and the controller is configured to control, according to the received wavelength, the optical switch to output the optical wave of the wavelength corresponding to the target memory to the optical modulator.

With reference to the first or the second possible implementation manner of the first aspect, in a third possible implementation manner of the first aspect, the controller is specifically configured to determine, according to a preset correspondence between an optical wavelength and an optical input end of the optical switch, an optical input end of the optical wave of the wavelength corresponding to the target memory; control the optical switch to open the determined optical input end; and control the optical switch to open an output end connected to the optical modulator, so that the optical switch outputs the optical wave of the wavelength corresponding to the target memory to the optical modulator.

In a fourth possible implementation manner of the first aspect, the signal generator includes a processor and a controller, the processor is separately connected to the optical modulator and the controller, and the controller is connected to the electrical input end of the optical switch, where the processor is specifically configured to determine, according to the preset correspondence between a memory identifier and an optical wavelength, the wavelength corresponding to the target memory; determine, according to a preset correspondence between an optical wavelength and an optical input end of the optical switch, an optical input end that is of the optical switch and corresponds to the wavelength corresponding to the target memory; and send a third control signal to the controller, where the third control signal carries an identifier of the determined optical input end; and the controller is configured to control, according to the received identifier of the optical input end, the optical switch to open the optical input end; and control the optical switch to open an output end connected to the optical modulator, so as to control the optical switch to transmit the optical wave of the wavelength corresponding to the target memory to the optical modulator.

With reference to any one of the first to the fourth possible implementation manners of the first aspect, in a fifth possible implementation manner of the first aspect, the target memory corresponds to multiple optical wavelengths, and the optical wavelengths correspond to optical input ends of the optical switch in a one-to-one manner.

With reference to any one of the first to the fifth possible implementation manners of the first aspect, in a sixth possible implementation manner of the first aspect, the processor corresponds to multiple optical modulators, and each optical modulator is connected to one output end of the optical switch.

With reference to any one of the first to the sixth possible implementation manners of the first aspect, in a seventh possible implementation manner of the first aspect, the data sending apparatus further includes a storage device, and the storage device stores the preset correspondence between an optical wavelength and an optical input end of the optical switch and the preset correspondence between a memory identifier and an optical wavelength.

According to a second aspect, an embodiment of the present disclosure provides a data sending apparatus, where the data sending apparatus includes a signal generator, an optical switch, and an optical modulator, and the data sending apparatus accesses a memory of a data receiving apparatus using an optical transmission medium; an electrical input end of the optical switch is connected to the signal generator, an optical input end of the optical switch is connected to a multi-wavelength light source and receives an optical wave emitted by the multi-wavelength light source, an output end of the optical switch is connected to an optical input end of the optical modulator, and the signal generator is connected to a signal input end of the optical modulator; the signal generator is configured to send an electrical signal to the optical modulator, where the electrical signal carries an access request for a target memory; and control, according to a preset correspondence between a memory identifier and an optical wavelength, the optical switch to output an optical wave of a wavelength corresponding to the target memory to the optical modulator; and the optical modulator is configured to receive the optical wave sent by the optical switch; receive the electrical signal input by the signal generator; use the electrical signal to modulate the optical wave, so that the electrical signal is loaded to the optical wave to form an optical signal; and send, using the optical transmission medium, the optical signal to the data receiving apparatus in which the target memory is located.

In a first possible implementation manner of the second aspect, the signal generator includes a processor and a controller, the processor is separately connected to the optical modulator and the controller, and the controller is connected to the electrical input end of the optical switch, where the processor is configured to: send a first control signal to the controller, where the first control signal carries an identifier of the target memory that is to be accessed by the processor; and send the electrical signal to the optical modulator; and the controller is configured to receive the first control signal; determine, according to the preset correspondence between a memory identifier and an optical wavelength, the wavelength corresponding to the target memory; and control the optical switch to output the optical wave of the wavelength corresponding to the target memory to the optical modulator.

In a second possible implementation manner of the second aspect, where the processor is configured to search for, according to the preset correspondence between a memory identifier and an optical wavelength, the wavelength corresponding to the target memory; send a second control signal to the controller, where the second control signal carries the wavelength corresponding to the target memory; and send the electrical signal to the optical modulator; and the controller is configured to control, according to the received wavelength, the optical switch to output the optical wave of the wavelength corresponding to the target memory to the optical modulator.

With reference to the first or the second possible implementation manner of the second aspect, in a third possible implementation manner, the signal generator includes a processor and a controller, the processor is separately connected to the optical modulator and the controller, and the controller is connected to the electrical input end of the optical switch, where the controller is specifically configured to determine, according to a preset correspondence between an optical wavelength and an optical input end of the optical switch, an optical input end of the optical wave of the wavelength corresponding to the target memory; control the optical switch to open the determined optical input end; and control the optical switch to open an output end connected to the optical modulator, so that the optical switch outputs the optical wave of the wavelength corresponding to the target memory to the optical modulator.

According to a third aspect, an embodiment of the present disclosure provides a data receiving apparatus, where the data receiving apparatus includes a demultiplexer, multiple memories, and optical receivers corresponding to the multiple memories in a one-to-one manner, the demultiplexer of the data receiving apparatus is connected to a data sending apparatus using an optical transmission medium, and the demultiplexer is connected to the optical receivers; the demultiplexer is configured to receive, using the optical transmission medium, an optical signal sent by the data sending apparatus, where the optical signal is used to access a target memory in the multiple memories; demultiplex the optical signal; and send, according to a preset correspondence between a memory identifier and an optical wavelength, a demultiplexed optical signal to an optical receiver of a target memory corresponding to a wavelength of the demultiplexed optical signal; and the optical receiver is configured to: receive and recover the demultiplexed optical signal to obtain an electrical signal; and send the electrical signal to the target memory, where the electrical signal carries an access request for the target memory.

According to a fourth aspect, an embodiment of the present disclosure provides a method for accessing a memory of a data receiving apparatus by a data sending apparatus, where the data sending apparatus includes a signal generator, an optical switch, and an optical modulator; and the method includes sending, by the signal generator, an electrical signal to the optical modulator, where the electrical signal carries an access request for a target memory; receiving, by the optical switch, an optical wave emitted by a multi-wavelength light source, and controlling, by the signal generator according to a preset correspondence between a memory identifier and an optical wavelength, the optical switch to output an optical wave of a wavelength corresponding to the target memory to the optical modulator; and receiving, by the optical modulator, the optical wave sent by the optical switch, receiving the electrical signal input by the signal generator, using the electrical signal to modulate the optical wave, so that the electrical signal is loaded to the optical wave to form an optical signal, and sending, using an optical transmission medium, the optical signal to the data receiving apparatus in which the target memory is located.

In a first possible implementation manner of the fourth aspect, the signal generator includes a processor and a controller; the sending, by the signal generator, an electrical signal to the optical modulator specifically includes sending, by the processor, the electrical signal to the optical modulator; and correspondingly, the controlling, by the signal generator according to a preset correspondence between a memory identifier and an optical wavelength, the optical switch to output an optical wave of a wavelength corresponding to the target memory to the optical modulator includes sending, by the processor, a first control signal to the controller, where the first control signal carries an identifier of the target memory that is to be accessed by the processor; and receiving, by the controller, the first control signal, determining, according to the preset correspondence between a memory identifier and an optical wavelength, the wavelength corresponding to the target memory, and controlling the optical switch to output the optical wave of the wavelength corresponding to the target memory to the optical modulator.

In a second possible implementation manner of the fourth aspect, the signal generator includes a processor and a controller; the sending, by the signal generator, an electrical signal to the optical modulator specifically includes sending, by the processor, the electrical signal to the optical modulator; and correspondingly, the controlling, by the signal generator according to a preset correspondence between a memory identifier and an optical wavelength, the optical switch to output an optical wave of a wavelength corresponding to the target memory to the optical modulator includes searching for, by the processor according to the preset correspondence between a memory identifier and an optical wavelength, the wavelength corresponding to the target memory, and sending a second control signal to the controller, where the second control signal carries the wavelength corresponding to the target memory; and controlling, by the controller according to the received wavelength, the optical switch to output the optical wave of the wavelength corresponding to the target memory to the optical modulator.

With reference to the first or the second possible implementation manner of the fourth aspect, in a third possible implementation manner, the controlling the optical switch to output the optical wave of the wavelength corresponding to the target memory to the optical modulator specifically includes determining, by the controller according to a preset correspondence between an optical wavelength and an optical input end of the optical switch, an optical input end of the optical wave of the wavelength corresponding to the target memory; controlling the optical switch to open the determined optical input end; and controlling the optical switch to open an output end connected to the optical modulator, so that the optical switch outputs the optical wave of the wavelength corresponding to the target memory to the optical modulator.

In a fourth possible implementation manner of the fourth aspect, the controlling, by the signal generator according to a preset correspondence between a memory identifier and an optical wavelength, the optical switch to output an optical wave of a wavelength corresponding to the target memory to the optical modulator further includes determining, by the processor according to the preset correspondence between a memory identifier and an optical wavelength, the wavelength corresponding to the target memory; determining, according to a preset correspondence between an optical wavelength and an optical input end of the optical switch, an optical input end that is of the optical switch and corresponds to the wavelength corresponding to the target memory; and sending a third control signal to the controller, where the third control signal carries an identifier of the determined optical input end; and controlling, by the controller according to the received identifier of the optical input end, the optical switch to open the optical input end; and controlling the optical switch to open an output end connected to the optical modulator, so as to control the optical switch to transmit the optical wave of the wavelength corresponding to the target memory to the optical modulator.

In a fifth possible implementation manner of the fourth aspect, the data receiving apparatus includes a demultiplexer, multiple memories, and optical receivers corresponding to the multiple memories in a one-to-one manner; and the method further includes receiving, by the demultiplexer using the optical transmission medium, an optical signal sent by the data sending apparatus, where the optical signal is used to access a target memory in the multiple memories; demultiplexing the optical signal; and sending, according to the preset correspondence between a memory identifier and an optical wavelength, a demultiplexed optical signal to an optical receiver of a target memory corresponding to a wavelength of the demultiplexed optical signal; and receiving and recovering, by the optical receiver, the demultiplexed optical signal to obtain an electrical signal, and sending the electrical signal to the target memory.

Embodiments of the present disclosure provide a memory access system, apparatus, and method, where the system includes a data sending apparatus, an optical transmission medium, and a data receiving apparatus. The data sending apparatus includes a signal generator, an optical switch, and an optical modulator. The data receiving apparatus includes a demultiplexer, multiple memories, and optical receivers corresponding to the multiple memories in a one-to-one manner. The signal generator controls, according to a preset correspondence between a memory identifier and an optical wavelength, the optical switch to output an optical wave of a wavelength corresponding to the target memory to the optical modulator. The optical modulator receives an electrical signal from the signal generator, uses the electrical signal to modulate the optical wave to obtain an optical signal, and sends the optical signal to the data receiving apparatus using the optical transmission medium. The demultiplexer of the data receiving apparatus demultiplexes the optical signal, and transmits a demultiplexed optical signal to a corresponding memory. In the foregoing execution manner of the present disclosure, the signal generator controls the optical switch to output the optical wave of the wavelength corresponding to the target memory, and the optical wave carries an electrical signal corresponding to an access request, so that an optical signal carrying the access request is directly transmitted from the optical transmission medium to the data receiving apparatus without passing through the optical switch anymore, which avoids noise interference generated when the optical signal passes through the optical switch. In a specific implementation manner of the present disclosure, the signal generator includes a processor and a controller. A control signal generated by the processor is transmitted to the optical switch always by the controller, thereby reducing physical connection complexity of an input end of the optical switch. In addition, the data sending apparatus is connected to the data receiving apparatus using an optical transmission medium, where the optical transmission medium is used to carry optical signals having different wavelengths. The demultiplexer of the data receiving apparatus transmits the optical signals having different wavelengths to corresponding target memories. In this way, a connection structure between the data sending apparatus and the data receiving apparatus is simple, which reduces complexity of cable layout in a system, and avoids a prior-art problem that a physical connection is cumbersome because the input end of the optical switch is separately connected to optical receivers of different processors.

BRIEF DESCRIPTION OF DRAWINGS

To describe the technical solutions in the embodiments of the present disclosure or in the prior art more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
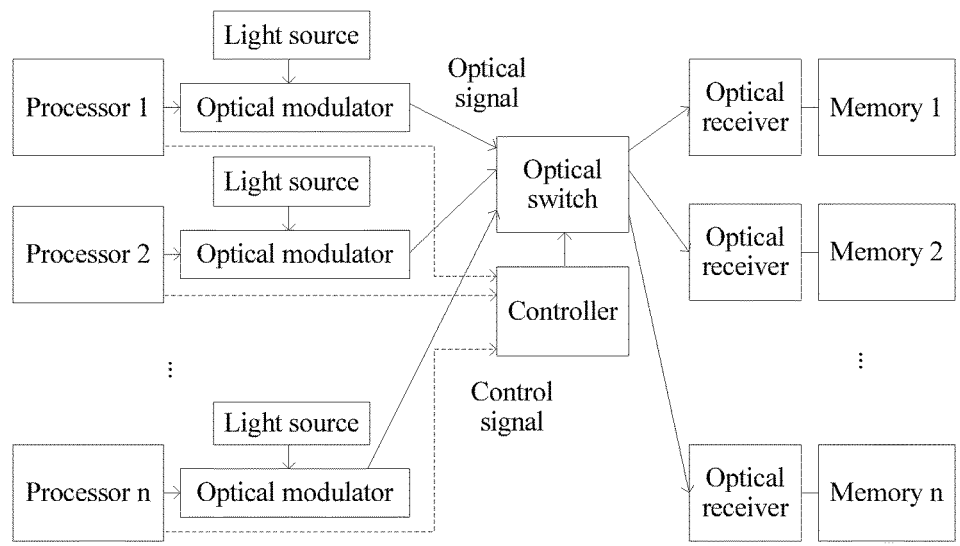
FIG. 1 is a schematic structural diagram of a multi-memory dynamic access system based on an optical route and switch technology in the prior art.

As shown in FIG. 1, FIG. 1 is a schematic structural diagram of a multi-memory dynamic access system based on an optical route and switch technology in the prior art. A controller of an optical switch is configured to control a route of the optical switch, where one end of the controller is connected to the optical switch, and the other end is connected to each processor. When needing to access a memory, one of the processors sends a control signal to the controller of the optical switch, so as to control a modulated optical signal to be transmitted to a target memory after the modulated optical signal passes through the optical switch, thereby implementing data transmission with the target memory. In this manner, the optical switch needs to be connected to an optical modulator of each processor; in addition, the optical switch is further connected to an optical receiver of each memory. With increasing quantities of processors and memories, optical transmission mediums are also correspondingly increasing, and a system cable layout structure is cumbersome. In addition, because the modulated optical signal sent by the processor is affected by noise when passing through the optical switch, the signal has a relatively low signal-to-noise ratio, and link signal integrity cannot be ensured.

Figure 2:
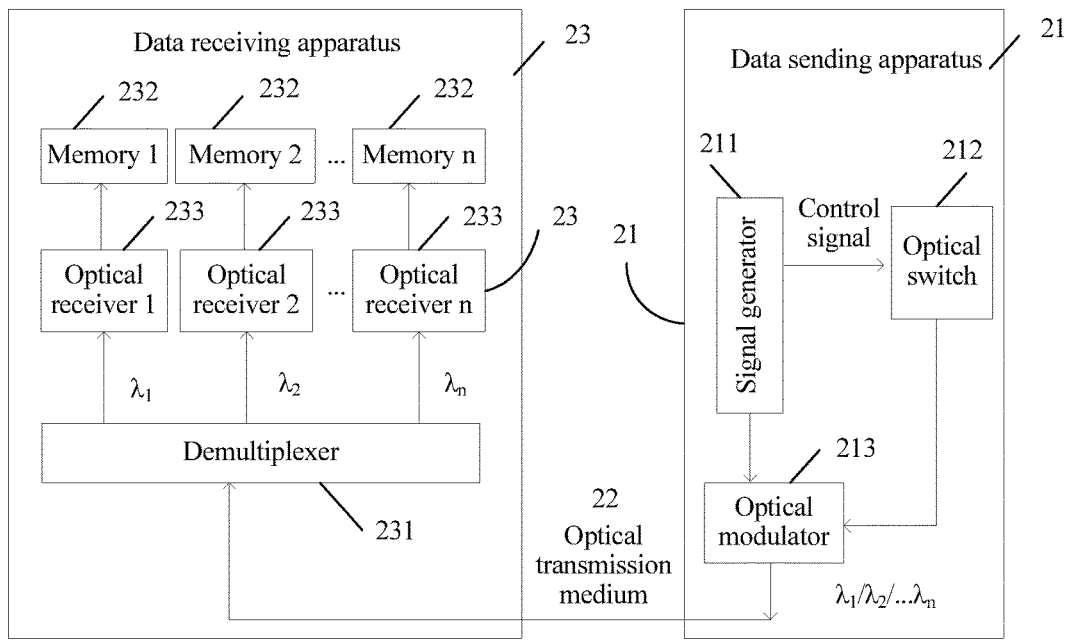
FIG. 2 is a schematic structural diagram of a memory access system according to an embodiment of the present disclosure.

For a disadvantage in a prior solution that an optical signal is affected by noise interference after passing through an optical switch, an embodiment of the present disclosure discloses a memory access system, where a schematic structural diagram of the system is shown in FIG. 2, and the system includes a data sending apparatus 21, an optical transmission medium 22, and a data receiving apparatus 23.

The data sending apparatus 21 includes a signal generator 211, an optical switch 212, and an optical modulator 213. The data receiving apparatus 23 includes a demultiplexer 231, multiple memories 232, and optical receivers 233 corresponding to the multiple memories in a one-to-one manner.

An electrical input end of the optical switch 212 is connected to the signal generator 211. An optical input end of the optical switch 212 is connected to a multi-wavelength light source, and receives an optical wave emitted by the multi-wavelength light source. An output end of the optical switch 212 is connected to an optical input end of the optical modulator 213. The signal generator 211 is connected to a signal input end of the optical modulator 213.

An input end of the demultiplexer 231 of the data receiving apparatus 23 is connected to the optical modulator 213 of the data sending apparatus 21 using the optical transmission medium 22, and an output end of the demultiplexer 231 of the data receiving apparatus 23 is connected to the optical receivers 233.

The signal generator 211 is configured to send an electrical signal to the optical modulator 213, where the electrical signal carries an access request for a target memory; and control, according to a preset correspondence between a memory identifier and an optical wavelength, the optical switch 212 to output an optical wave of a wavelength corresponding to the target memory to the optical modulator 213.

The optical modulator 213 is configured to receive the optical wave sent by the optical switch 212; receive the electrical signal input by the signal generator 211; use the electrical signal to modulate the optical wave, so that the electrical signal is loaded to the optical wave to form an optical signal; and send, using the optical transmission medium 22, the optical signal to the data receiving apparatus 23 in which the target memory is located.

The demultiplexer 231 is configured to receive the optical signal using the optical transmission medium 22; and send, according to the preset correspondence between a memory identifier and an optical wavelength, a demultiplexed optical signal to an optical receiver 233 corresponding to the target memory.

The optical receiver 233 is configured to convert the received optical signal into an electrical signal; and send the electrical signal to the target memory.

This embodiment of the present disclosure provides a memory access system, where the system includes a data sending apparatus, an optical transmission medium, and a data receiving apparatus. The data sending apparatus includes a signal generator, an optical switch, and an optical modulator. The data receiving apparatus includes a demultiplexer, multiple memories, and optical receivers corresponding to the multiple memories in a one-to-one manner. The signal generator controls, according to a preset correspondence between a memory identifier and an optical wavelength, the optical switch to output an optical wave of a wavelength corresponding to the target memory to the optical modulator. The optical modulator receives an electrical signal from the signal generator, uses the electrical signal to modulate the optical wave to obtain an optical signal, and sends the optical signal to the data receiving apparatus using the optical transmission medium. The demultiplexer of the data receiving apparatus demultiplexes the optical signal, and transmits a demultiplexed optical signal to a corresponding memory. In the foregoing execution manner of the present disclosure, the signal generator controls the optical switch to output the optical wave of the wavelength corresponding to the target memory, and the optical wave carries an electrical signal corresponding to an access request, so that an optical signal carrying the access request is directly transmitted from the optical transmission medium to the data receiving apparatus without passing through the optical switch anymore, which avoids noise interference generated when the optical signal passes through the optical switch.

It should be noted that in this embodiment of the present disclosure, different memories of a data receive end correspond to different wavelengths.

In a specific implementation manner, the signal generator may be including a processor and a controller, where there may be multiple processors. An optical wave may be generated by a multi-wavelength light source, where the multi-wavelength light source may be independent of the data sending apparatus or may be a component disposed in the data sending apparatus. The multi-wavelength light source provides the optical switch with multi-wavelength optical wave input, and the optical switch is connected to an optical modulator of each processor. The demultiplexer is added to the data receiving apparatus. The data sending apparatus stores a correspondence between a memory identifier and an optical wavelength. By controlling an optical path direction of the optical switch using a controller, each processor controls an optical wavelength sent by the optical switch to an optical modulator of the processor, so as to implement access to the target memory, and achieve an objective that multiple processors dynamically access multiple memories. In this embodiment of the present disclosure, an optical signal output by the optical modulator does not need to pass through the optical switch, which avoids noise impact brought by the optical switch and can significantly improve signal integrity of data sending and receiving links. In a specific implementation manner of the present disclosure, the signal generator includes a processor and a controller. A control signal generated by the processor is transmitted to the optical switch always by the controller, thereby reducing physical connection complexity of an input end of the optical switch. In addition, the data sending apparatus is connected to the data receiving apparatus using an optical transmission medium, where the optical transmission medium is used to carry optical signals having different wavelengths. The demultiplexer of the data receiving apparatus transmits the optical signals having different wavelengths to corresponding target memories. In this way, a system connection structure is simple, which reduces complexity of cable layout in a system, and avoids a prior-art problem that a physical connection is cumbersome because the input end of the optical switch is separately connected to optical receivers of different processors.

It should be noted that in this embodiment of the present disclosure, in terms of a specific implementation form, the data sending apparatus may be a blade in a server, and the data receiving apparatus may also be a blade in a server. The data sending apparatus and the data receiving apparatus may be located in a same server, or may be located in two different servers respectively. When the data sending apparatus and the data receiving apparatus are located in two different servers respectively, the two servers may be disposed at different locations of a network to perform remote communication, or may be used as local servers to perform mutual local communication. In addition, a connection relationship related in this embodiment of the present disclosure may be a physical connection or may be a logical connection, and a specific connection manner is determined according to a practical situation, which is not limited in this embodiment of the present disclosure.

Figure 3:
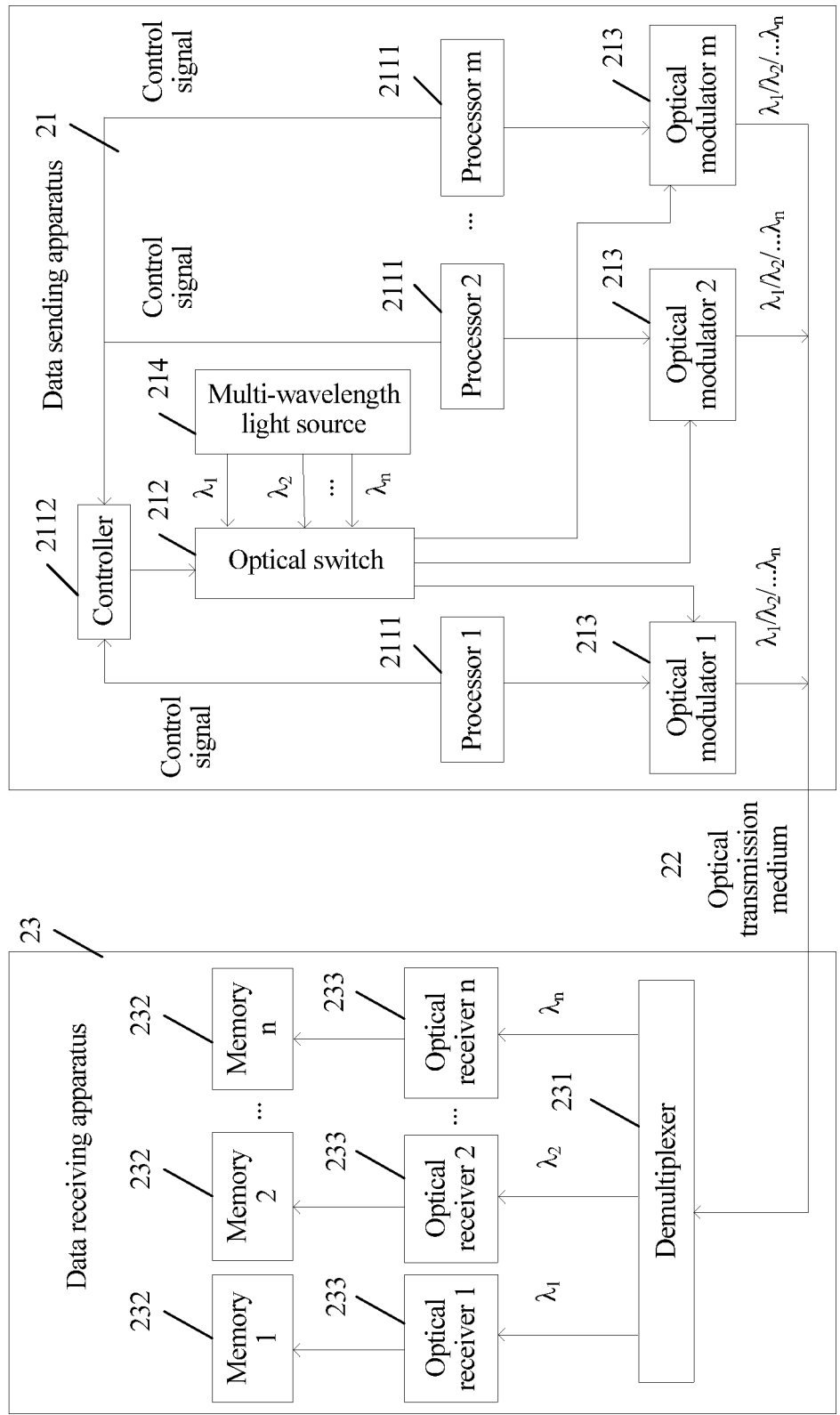
FIG. 3 is a schematic structural diagram of another memory access system according to an embodiment of the present disclosure.

As shown in FIG. 3, FIG. 3 shows another memory access system according to an embodiment of the present disclosure. A system connection structure is similar to that of the embodiment shown in FIG. 2. The system includes a data sending apparatus 21, an optical transmission medium 22, and a data receiving apparatus 23. The data sending apparatus 21 includes a signal generator, an optical switch 212, and optical modulators 213, wherein the signal generator includes processors 2111 and a controller 2112. The data receiving apparatus 23 includes a demultiplexer 231, multiple memories 232, and optical receivers 233 corresponding to the multiple memories in a one-to-one manner. An electrical input end of the optical switch 212 is connected to the signal generator. An optical input end of the optical switch 212 is connected to a multi-wavelength light source 214. An output end of the optical switch 212 is connected to an optical input end of the optical modulator 213. The signal generator is connected to a signal input end of the optical modulator 213. An input end of the demultiplexer 231 of the data receiving apparatus 23 is connected to the optical modulator 213 of the data sending apparatus 21 using the optical transmission medium 22, and an output end of the demultiplexer 231 of the data receiving apparatus 23 is connected to the optical receivers 233. Further, where the processor 2111 is separately connected to the optical modulator 213 and the controller 2112, and the controller 2112 is connected to the electrical input end of the optical switch 212. The data sending apparatus 21 may further include the multi-wavelength light source 214. The processor 2111 may correspond to one or more optical modulators 213 (an example in which one processor corresponds to one optical modulator is used in FIG. 3). The demultiplexer 231 of the data receiving apparatus 23 includes one input end and multiple output ends, where the input end is connected to the optical transmission medium 22, and each output end is connected to one optical receiver. A wavelength of an optical signal output by the output end is the same as a wavelength corresponding to a memory that is connected to the optical receiver. For example, in FIG. 3, an optical wavelength corresponding to a memory 1 is $\lambda_1$, and in this case, a wavelength of an optical signal output by an output end that is of a demultiplexer and that is connected to an optical receiver 1 of the memory 1 is $\lambda_1$. In this manner, when a series of optical signals enter the demultiplexer, an optical signal whose wavelength is $\lambda_1$ is output from the output end that is of the demultiplexer and that is connected to the optical receiver 1, so that an optical signal having a specific wavelength can be routed to a corresponding memory after passing through the demultiplexer.

That the signal generator controls, according to a preset correspondence between a memory identifier and an optical wavelength, the optical switch 212 to output an optical wave of a wavelength corresponding to a target memory to the optical modulator 213 includes three possible implementation manners.

Manner 1: The processor 2111 sends a first control signal to the controller 2112, where the first control signal carries an identifier of the target memory that is to be accessed by the processor 2111; and the controller 2112 receives the first control signal, determines, according to the preset correspondence between a memory identifier and an optical wavelength, the wavelength corresponding to the target memory, and controls the optical switch 212 to output the optical wave of the wavelength corresponding to the target memory to the optical modulator 213.

Manner 2: The processor 2111 searches for, according to the preset correspondence between a memory identifier and an optical wavelength, the wavelength corresponding to the target memory, sends a second control signal to the controller 2112, where the second control signal carries the wavelength corresponding to the target memory; and the controller 2112 controls, according to the received wavelength, the optical switch 212 to output the optical wave of the wavelength corresponding to the target memory to the optical modulator 213.

In the foregoing two manners, the controller 2112 can obtain the wavelength corresponding to the target memory. Further, the controller 2112 determines, according to a preset correspondence between an optical wavelength and an optical input end of the optical switch 212, an optical input end of the optical wave of the wavelength corresponding to the target memory, controls the optical switch 212 to open the determined optical input end, and controls the optical switch 212 to open an output end connected to the optical modulator 213, so that the optical switch 212 outputs the optical wave of the wavelength corresponding to the target memory to the optical modulator 213.

Manner 3: The processor 2111 determines, according to the preset correspondence between a memory identifier and an optical wavelength, the wavelength corresponding to the target memory; determines, according to a preset correspondence between an optical wavelength and an optical input end of the optical switch 212, an optical input end that is of the optical switch 212 and corresponds to the wavelength corresponding to the target memory; and sends a third control signal to the controller 2112, where the third control signal carries an identifier of the determined optical input end; and the controller 2112 controls, according to the received identifier of the optical input end, the optical switch 212 to open the optical input end, and controls the optical switch 212 to open an output end connected to the optical modulator 213, so as to control the optical switch 212 to transmit the optical wave of the wavelength corresponding to the target memory to the optical modulator 213.

In manner 3, the processor 2111 determines the optical input end that is of the optical switch 212 and that needs to be opened, and sends the identifier of the determined optical input end to the controller 2112; and the controller 2112 completes a subsequent control operation.

The data sending apparatus 21 further includes a storage device, where the storage device stores the preset correspondence between an optical wavelength and an optical input end of the optical switch 212 and the preset correspondence between a memory identifier and an optical wavelength. The processor 2111 or the controller 2112 is connected to the storage device, and reads a needed correspondence from the storage device. The storage device may be a storage component such as a cache or a hard disk.

In a specific scenario, the target memory corresponds to multiple optical wavelengths, and the optical wavelengths correspond to optical input ends of the optical switch in a one-to-one manner. That is, each optical input end of the optical switch corresponds to one optical wavelength. When the target memory corresponds to multiple optical wavelengths, the processor may control the optical switch to open optical input ends that correspond to the multiple optical wavelengths corresponding to the target memory, so that optical waves of the multiple optical wavelengths corresponding to the target memory are input to the optical switch, and are output to the optical modulator 213 of the processor.

The optical transmission medium may use an optical fiber or an optical waveguide.

The multi-wavelength light source 214 is formed by a wide-spectrum laser and a demultiplexer, or the multi-wavelength light source 214 is a laser array formed by multiple single-wavelength lasers.

Exemplary description of the multi-wavelength light source and the optical switch in the foregoing system is further given in this embodiment of the present disclosure. It should be noted that the following description given in this embodiment of the present disclosure is only an example of the multi-wavelength light source and the optical switch. A person skilled in the art may use another available multi-wavelength light source and another available optical switch.

Figure 4:
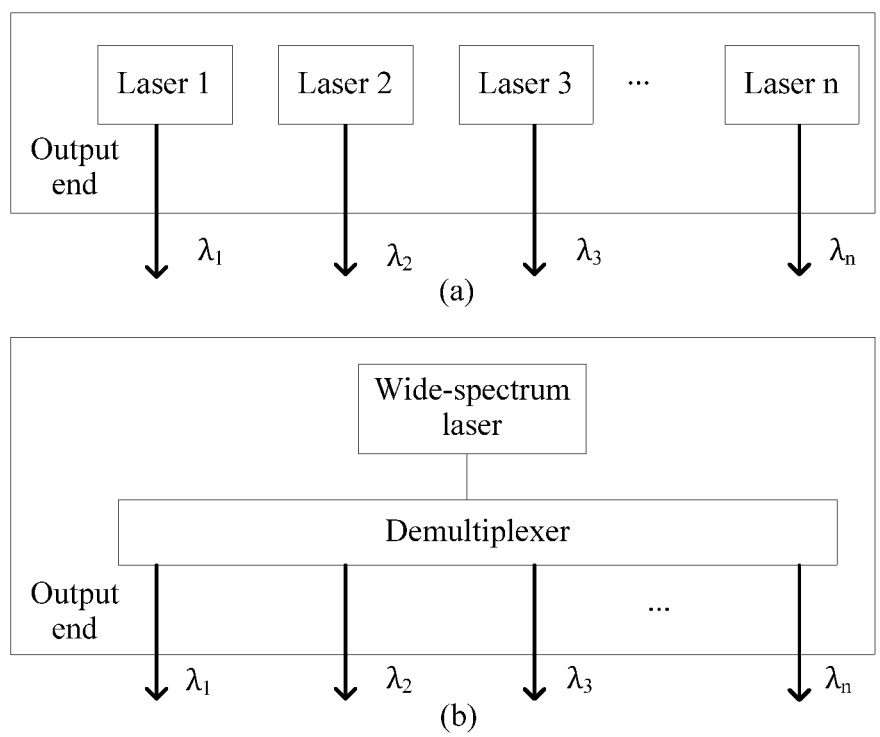
FIG. 4 is a schematic structural diagram of a multi-wavelength light source according to an embodiment of the present disclosure.

As shown in FIG. 4, FIG. 4 is a schematic structural diagram of a multi-wavelength light source according to an embodiment of the present disclosure. FIG. 4A indicates that the multi-wavelength light source is a laser array formed by multiple single-wavelength lasers, where a wavelength of each single-wavelength laser corresponds to an optical wavelength corresponding to a memory, and is $\lambda_1$ to $\lambda_n$. The laser may be a Fabry-Pérot (FP) type laser, a distributed feed back (DFB) laser, a vertical cavity surface emitting laser (VCSEL), or the like. A multi-wavelength light source shown in FIG. 4B is formed by a wide-spectrum laser and a wavelength demultiplexer, where a spectral range of the wide-spectrum laser needs to cover wavelengths $\lambda_1$ to $\lambda_n$. A wide-spectrum light source such as an amplified spontaneous emission (ASE) laser has a relatively wide emergent spectral range. The demultiplexer may be implemented using an arrayed waveguide grating (AWG), and is responsible for converting wide-spectrum light emitted by the wide-spectrum laser into a multi-wavelength light source corresponding to $\lambda_1$ to $\lambda_n$. It should be noted that an implementation manner of the multi-wavelength light source may use another manner in the prior art, provided that it is ensured that a wavelength range of output light covers optical wavelengths $\lambda_1$ to $\lambda_n$ corresponding to all memories of a data receiving apparatus.

Figure 5:
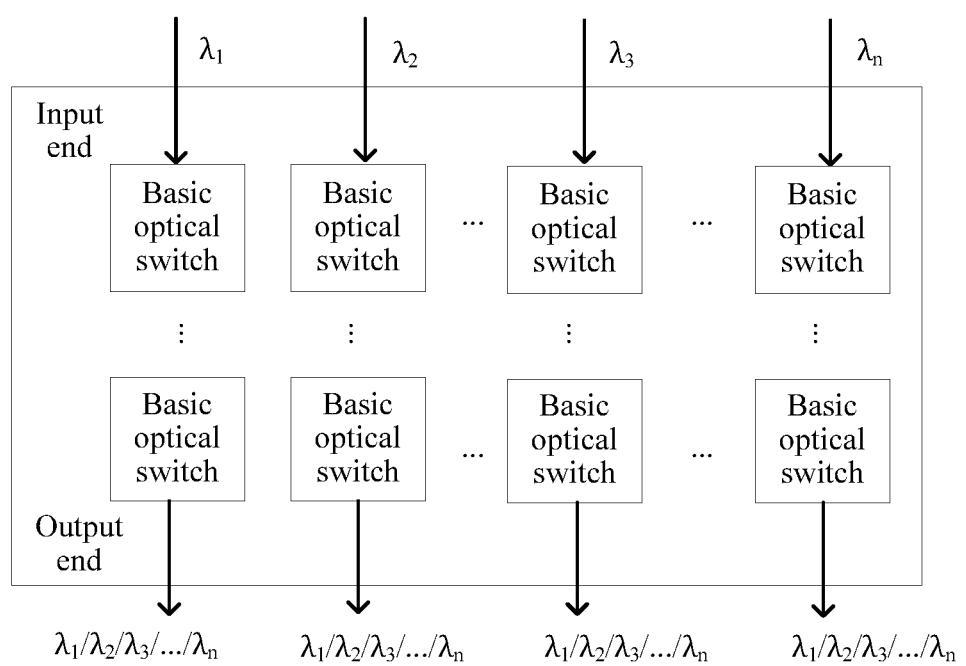
FIG. 5 is a schematic structural diagram of an optical switch according to an embodiment of the present disclosure.

As shown in FIG. 5, FIG. 5 is a schematic structural diagram of an optical switch according to an embodiment of the present disclosure, where the optical switch includes n input ends, n*m basic optical switch components, and m output ends, where m is a quantity of processors in a data sending apparatus. An input end of the optical switch is connected to an output end of a multi-wavelength light source; and an output end of the optical switch is connected to an optical modulator of a processor. The multiple basic optical switch components may be a microring resonator optical switch or a Mach-Zehnder interferometer (MZI) optical switch. The multiple basic optical switch components are basic components that form n×m optical switches.

In a specific scenario, the processor accesses a target memory, and a controller is specifically configured to control the optical switch to open an optical input end of an optical wave of a wavelength corresponding to the target memory, and control the optical switch to open an output end connected to the optical modulator of the processor, so that the optical switch outputs the optical wave of the wavelength corresponding to the target memory to the optical modulator. For a specific manner of controlling the optical switch to open the optical input end, reference may be made to the foregoing three manners.

In this embodiment of the present disclosure, an optical receiver may use an existing optical receiver, where the optical receiver includes a photoelectric detector, a detector driver, and a serial-to-parallel convertor. The photoelectric detector may use a silicon positive-intrinsic-negative (PIN) detector, a germanium detector, or the like, and is configured to convert a received optical signal into an electrical signal. The detector driver is configured to convert a weak electrical signal output by the detector into a relatively strong voltage signal, and transport the voltage signal to the serial-to-parallel convertor. The serial-to-parallel convertor converts a high-speed electrical signal into multiple low-speed electrical signals, so as to match a memory interface.

An embodiment of the present disclosure further provides a data sending apparatus. With reference to the structure of the data sending apparatus 21 shown in FIG. 2, the data sending apparatus includes a signal generator 211, an optical switch 212, and an optical modulator 213. The data sending apparatus accesses a memory of a data receiving apparatus 23 using an optical transmission medium 22.

An electrical input end of the optical switch 212 is connected to the signal generator 211. An optical input end of the optical switch 212 is connected to a multi-wavelength light source 214, and receives an optical wave emitted by the multi-wavelength light source 214. An output end of the optical switch 212 is connected to an optical input end of the optical modulator 213. The signal generator 211 is connected to a signal input end of the optical modulator 213.

The signal generator 211 is configured to send an electrical signal to the optical modulator 213, where the electrical signal carries an access request for a target memory; and control, according to a preset correspondence between a memory identifier and an optical wavelength, the optical switch 212 to output an optical wave of a wavelength corresponding to the target memory to the optical modulator 213.

The optical modulator 213 is configured to receive the optical wave sent by the optical switch 212; receive the electrical signal input by the signal generator 211; use the electrical signal to modulate the optical wave, so that the optical signal is loaded to the optical wave to form an optical signal; and send, using the optical transmission medium 22, the optical signal to the data receiving apparatus 23 in which the target memory is located.

Specifically, as shown in FIG. 3, the signal generator 211 includes a processor 2111 and a controller 2112, where the processor 2111 is separately connected to the optical modulator 213 and the controller 2112, the controller 2112 is connected to the electrical input end of the optical switch 212, and the processor 2111 cooperates with the controller 2112 to control, according to the foregoing three manners, the optical switch 212 to open a corresponding optical input end and an output end that is connected to the optical modulator 213 of the processor 2111. Specifically:

Manner 1:

The processor 2111 is configured to send a first control signal to the controller 2112, where the first control signal carries an identifier of the target memory that is to be accessed by the processor 2111; and send the electrical signal to the optical modulator 213; and the controller 2112 is configured to receive the first control signal; determine, according to the preset correspondence between a memory identifier and an optical wavelength, the wavelength corresponding to the target memory; and control the optical switch 212 to output the optical wave of the wavelength corresponding to the target memory to the optical modulator 213.

Manner 2:

The processor 2111 is configured to search for, according to the preset correspondence between a memory identifier and an optical wavelength, the wavelength corresponding to the target memory; send a second control signal to the controller 2112, where the second control signal carries the wavelength corresponding to the target memory; and send the electrical signal to the optical modulator 213; and the controller 2112 is configured to control, according to the received wavelength, the optical switch 212 to output the optical wave of the wavelength corresponding to the target memory to the optical modulator 213.

In a specific implementation manner, the controller 2112 is specifically configured to determine, according to a preset correspondence between an optical wavelength and an optical input end of the optical switch 212, an optical input end of the optical wave of the wavelength corresponding to the target memory; control the optical switch 212 to open the determined optical input end; and control the optical switch 212 to open an output end connected to the optical modulator 213, so that the optical switch 212 outputs the optical wave of the wavelength corresponding to the target memory to the optical modulator 213.

Manner 3:

The processor 2111 is specifically configured to determine, according to the preset correspondence between a memory identifier and an optical wavelength, the wavelength corresponding to the target memory; determine, according to a preset correspondence between an optical wavelength and an optical input end of the optical switch 212, an optical input end that is of the optical switch 212 and corresponds to the wavelength corresponding to the target memory; and send a third control signal to the controller 2112, where the third control signal carries an identifier of the determined optical input end; and the controller 2112 is configured to control, according to the received identifier of the optical input end, the optical switch 212 to open the optical input end; and control the optical switch 212 to open an output end connected to the optical modulator 213, so as to control the optical switch 212 to transmit the optical wave of the wavelength corresponding to the target memory to the optical modulator 213.

With reference to the structure of the data receiving apparatus shown in FIG. 2, an embodiment of the present disclosure further provides a data receiving apparatus 23. The data receiving apparatus 23 includes a demultiplexer 231, multiple memories 232, and optical receivers 233 corresponding to the multiple memories 232 in a one-to-one manner, where the demultiplexer 231 of the data receiving apparatus 23 is connected to a data sending apparatus using an optical transmission medium 22, and the demultiplexer 231 is connected to the optical receivers 233.

The demultiplexer 231 is configured to receive, using the optical transmission medium 22, an optical signal sent by the data sending apparatus 21, where the optical signal is used to access a target memory in the multiple memories 232; demultiplex the optical signal; send, according to a preset correspondence between a memory identifier and an optical wavelength, a demultiplexed optical signal to an optical receiver 233 of a target memory corresponding to a wavelength of the demultiplexed optical signal; and the optical receiver 233 is configured to receive and recover the demultiplexed optical signal to obtain an electrical signal; and send the electrical signal to the target memory, where the electrical signal carries an access request for the target memory.

The embodiments of the present disclosure provide a memory access system, a data sending apparatus, and a data receiving apparatus, where the system includes the data sending apparatus, an optical transmission medium, and the data receiving apparatus. The data sending apparatus includes a signal generator, an optical switch, and an optical modulator. The data receiving apparatus includes a demultiplexer, multiple memories, and optical receivers corresponding to the multiple memories in a one-to-one manner. The signal generator controls, according to a preset correspondence between a memory identifier and an optical wavelength, the optical switch to output an optical wave of a wavelength corresponding to the target memory to the optical modulator. The optical modulator receives an electrical signal from the signal generator, uses the electrical signal to modulate the optical wave to obtain an optical signal, and sends the optical signal to the data receiving apparatus using the optical transmission medium. The demultiplexer of the data receiving apparatus demultiplexes the optical signal, and transmits a demultiplexed optical signal to a corresponding memory. In the foregoing execution manner of the present disclosure, the signal generator controls the optical switch to output the optical wave of the wavelength corresponding to the target memory, and the optical wave carries an electrical signal corresponding to an access request, so that an optical signal carrying the access request is directly transmitted from the optical transmission medium to the data receiving apparatus without passing through the optical switch anymore, which avoids noise interference generated when the optical signal passes through the optical switch. In a specific implementation manner of the present disclosure, the signal generator includes a processor and a controller. A control signal generated by the processor is transmitted to the optical switch always by the controller, thereby reducing physical connection complexity of an input end of the optical switch. In addition, the data sending apparatus is connected to the data receiving apparatus using an optical transmission medium, where the optical transmission medium is used to carry optical signals having different wavelengths. The demultiplexer of the data receiving apparatus transmits the optical signals having different wavelengths to corresponding target memories. In this way, a system connection structure is simple, which reduces complexity of cable layout in a system, and avoids a prior-art problem that a physical connection is cumbersome because the input end of the optical switch is separately connected to optical receivers of different processors.

Figure 6:
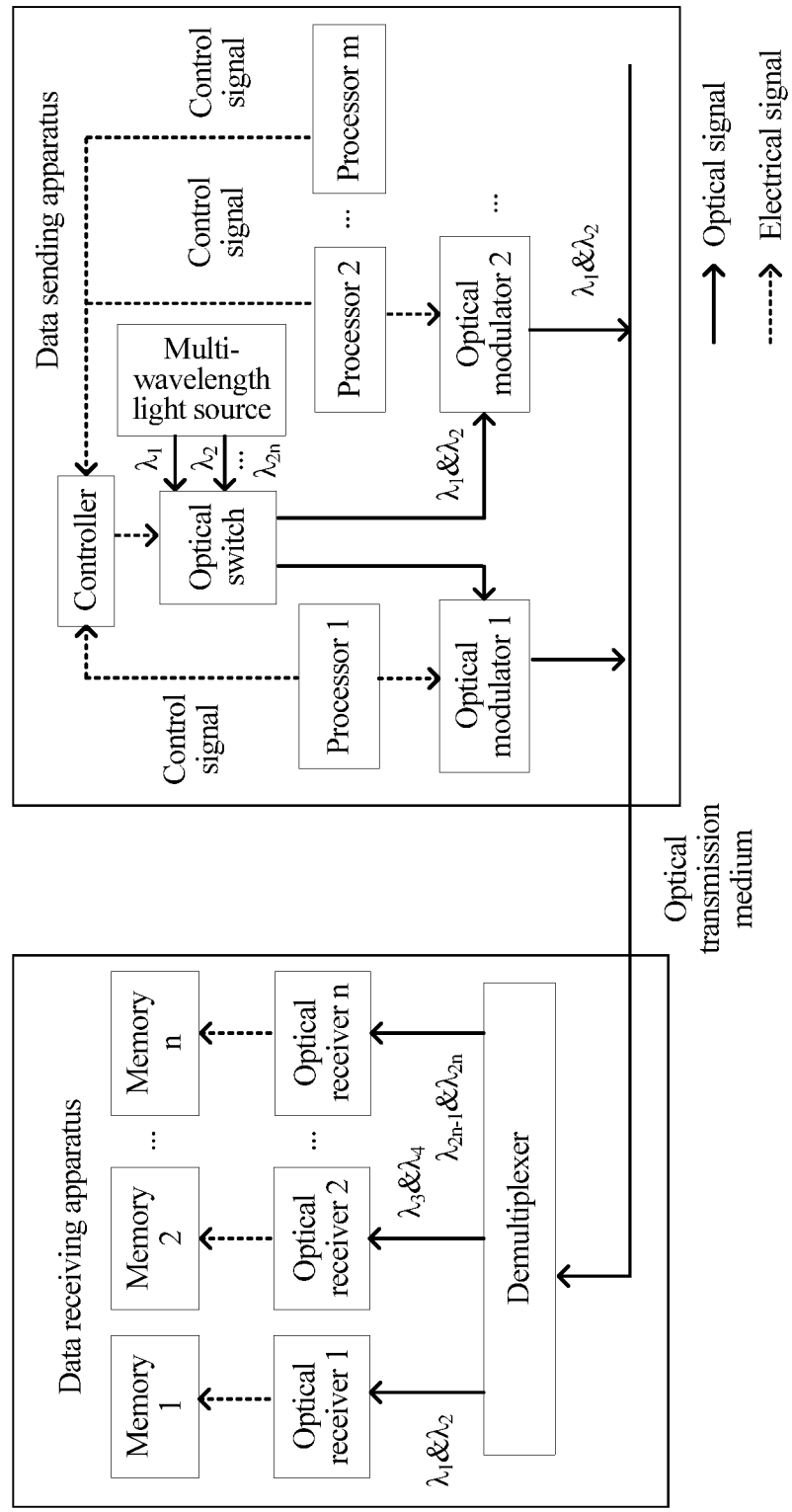
FIG. 6 is a schematic structural diagram of another memory access system according to an embodiment of the present disclosure.

Optionally, in practical application, access bandwidth of a memory is very high, and a data volume transmitted by an optical wave within a unit time is limited. To make better use of the access bandwidth of the memory, an access request for one target memory may be carried on multiple optical waves having different wavelengths, that is, one memory corresponds to multiple optical wavelengths. As shown in FIG. 6, an embodiment of the present disclosure further provides a memory access system, and an optical receiver of each memory corresponds to multiple optical wavelengths, that is, in a preset correspondence between a memory identifier and an optical wavelength, the target memory corresponds to multiple optical waves having different wavelengths. In FIG. 6, an example in which each memory corresponds to two optical wavelengths is used for description, and in this case, a quantity of wavelengths corresponding to n memories is 2n, where $\lambda_1$ and $\lambda_2$ correspond to a memory 1, $\lambda_3$ and $\lambda_4$ correspond to a memory 2, and by analogy, $\lambda_{2n-1}$ and $\lambda_{2n}$ correspond to a memory n.

Therefore, a multi-wavelength light source of a data sending apparatus includes carriers having 2n optical wavelengths, an optical switch includes 2n input ends, and a demultiplexer of a data receiving apparatus includes 2n output end. An example in which a processor 2 accesses the memory 1 is used, and in this case, the processor 2 needs to send a control signal to a controller, so that optical carriers whose wavelengths are $\lambda_1$ and $\lambda_2$ are sent to an optical modulator of the processor. After modulated optical signals pass through an optical transmission medium, optical signals whose wavelengths are $\lambda_1$ and $\lambda_2$ are sent to an optical receiver of the memory 1 by the demultiplexer, so as to implement access to the memory 1. It should be noted that a process in which the processor controls, using the controller, the optical switch to output the optical carriers whose wavelengths are $\lambda_1$ and $\lambda_2$ to an optical modulator of the processor is similar to the foregoing process, that is, the processor controls the optical switch to open optical input ends corresponding to the optical carriers whose wavelengths are $\lambda_1$ and $\lambda_2$, and open an output end that is of the optical switch and that is connected to the optical modulator of the processor.

Figure 7:
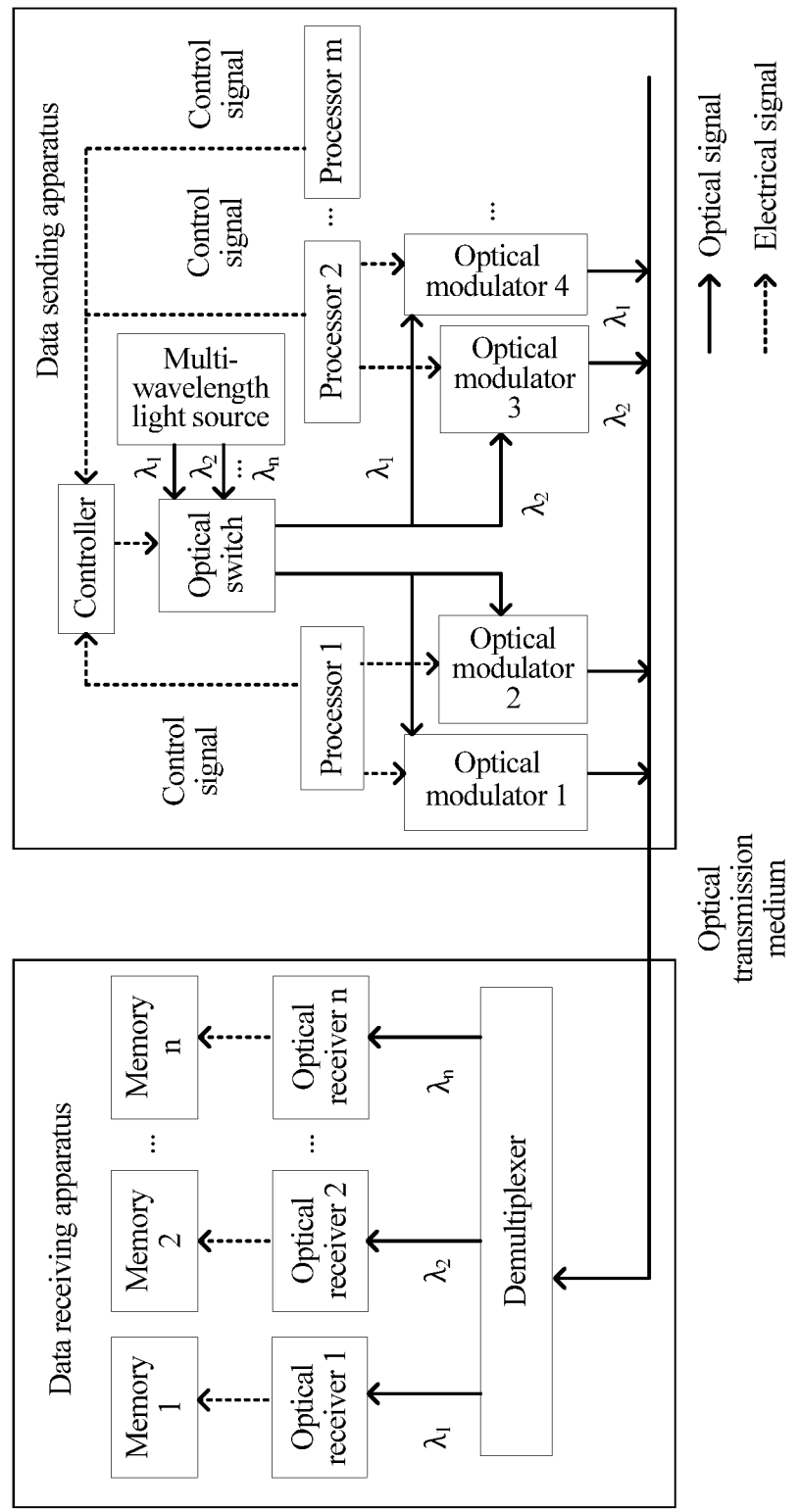
FIG. 7 is a schematic structural diagram of another memory access system according to an embodiment of the present disclosure.

In the foregoing embodiment, the processor corresponds to one optical modulator. It is extensible that each processor may correspond to multiple optical modulators. As shown in FIG. 7, FIG. 7 is a schematic structural diagram of another memory access system according to an embodiment of the present disclosure. An example in which each processor corresponds to two optical modulators is used for description, where each optical modulator may modulate an optical carrier having one wavelength, and may implement that one processor simultaneously accesses multiple memories. Therefore, a quantity of optical modulators of each processor is a maximum quantity of memories that can be simultaneously accessed by the processor. For example, a processor 2 simultaneously accesses a memory 1 and a memory 2. The processor 2 sends a control signal to a controller, so that optical carriers of $\lambda_1$ and $\lambda_2$ are simultaneously sent to the processor 2 after passing through an optical switch. A carrier having one optical wavelength is separately allocated to both optical modulators. In this way, after the processor modulates an electrical signal on each optical modulator, an optical signal is separately transferred to an optical receiver of the memory 1 and an optical receiver of the memory 2 after passing through an optical transmission medium, thereby implementing simultaneous access to the two memories. It should be noted that an electrical signal that corresponds to an access request used for accessing a target memory and that is sent by the processor may be divided into two parts, which are respectively sent to the two optical modulators of the processor. The two optical modulators use the foregoing two optical carriers to modulate the received electrical signal. A technology that the electrical signal sent by the processor is separately modulated by two modulators may use an existing standard manner. This embodiment of the present disclosure imposes no limitation thereto.

Corresponding to the foregoing system and apparatus embodiments, an embodiment of the present disclosure further provides a memory access method.

Figure 8:
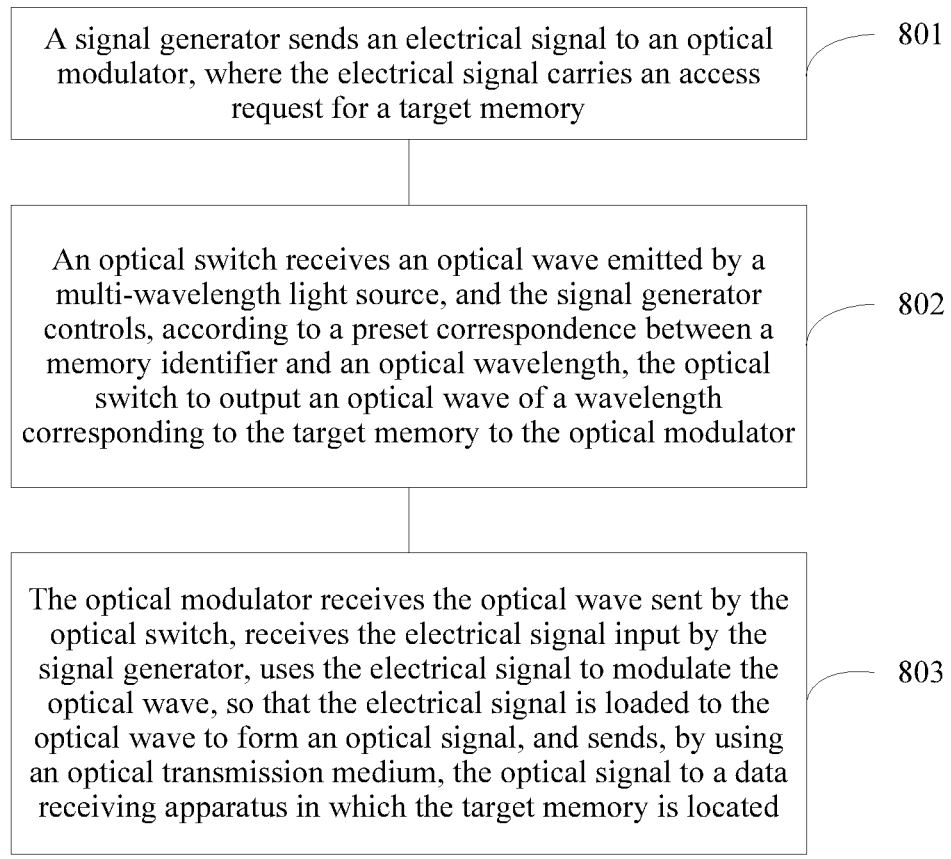
FIG. 8 is a schematic flowchart of a method for accessing a memory of a data receiving apparatus by a data sending apparatus according to an embodiment of the present disclosure.

As shown in FIG. 8, FIG. 8 is a schematic flowchart of a method for accessing a memory of a data receiving apparatus by a data sending apparatus according to an embodiment of the present disclosure, where the data sending apparatus includes a signal generator, an optical switch, and an optical modulator; and the method includes the following steps.

Step 801: The signal generator sends an electrical signal to the optical modulator, where the electrical signal carries an access request for a target memory.

Step 802: The optical switch receives an optical wave emitted by a multi-wavelength light source, and the signal generator controls, according to a preset correspondence between a memory identifier and an optical wavelength, the optical switch to output an optical wave of a wavelength corresponding to the target memory to the optical modulator.

Step 803: The optical modulator receives the optical wave sent by the optical switch; receives the electrical signal input by the signal generator; uses the electrical signal to modulate the optical wave, so that the electrical signal is loaded to the optical wave to form an optical signal; and sends, using an optical transmission medium, the optical signal to the data receiving apparatus in which the target memory is located.

Figure 9:
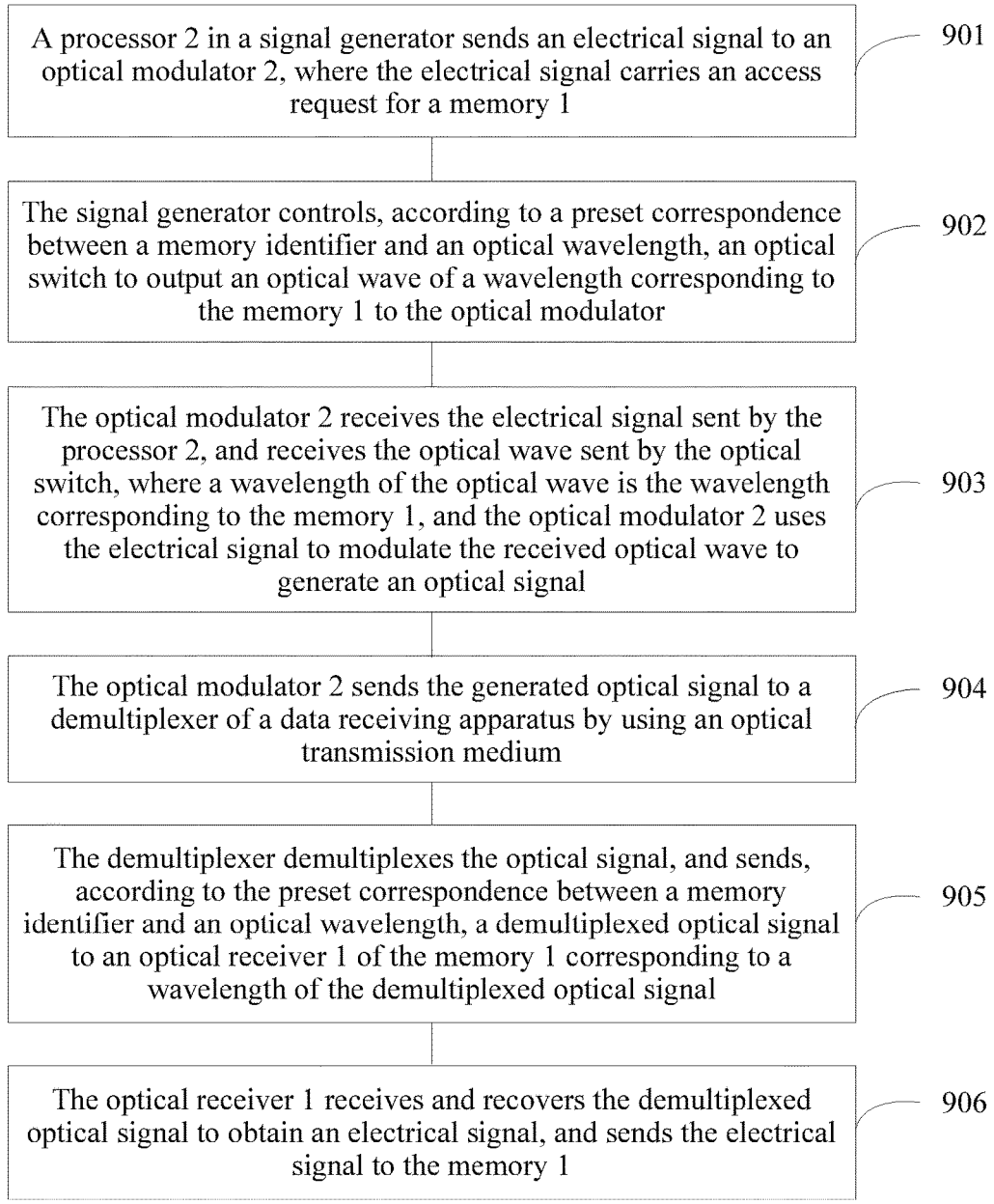
FIG. 9 is a schematic flowchart of another method for accessing a memory of a data receiving apparatus by a data sending apparatus according to an embodiment of the present disclosure.

With reference to the system structure corresponding to FIG. 3, as shown in FIG. 9, an embodiment of the present disclosure provides a schematic flowchart of another method for accessing a memory of a data receiving apparatus by a data sending apparatus. In this embodiment of the present disclosure, it is assumed that the data sending apparatus includes m processors, the data receiving apparatus includes n memories, and optical wavelengths $\lambda_1$ to $\lambda_n$ respectively indicate corresponding optical wavelengths of signals received by optical receivers of memories 1 to n. In this case, in an optical transmission medium, an optical signal whose wavelength is $\lambda_1$ is to be transferred to an optical receiver of the memory 1 by a demultiplexer, an optical signal whose wavelength is $\lambda_2$ is to be transferred to an optical receiver of the memory 2 by the demultiplexer, and so on. In this embodiment of the present disclosure, an example in which a processor 2 accesses the memory 1 is used to describe a working process in which the data sending apparatus accesses a memory in the data receiving apparatus, which includes the following steps.

Step 901: The processor 2 in a signal generator sends an electrical signal to an optical modulator 2, where the electrical signal carries an access request for the memory 1.

Step 902: The signal generator controls, according to a preset correspondence between a memory identifier and an optical wavelength, an optical switch to output an optical wave of a wavelength corresponding to the memory 1 to the optical modulator.

Specifically, step 902 has three possible implementation manners:

Manner 1: a. The processor 2 sends a first control signal to a controller, where the first control signal carries an identifier of the memory 1.

b. The controller receives the first control signal, determines, according to the preset correspondence between a memory identifier and an optical wavelength, the optical wavelength corresponding to the memory 1, determines, according to a preset correspondence between an optical wavelength and an optical input end of the optical switch, an optical input end that is of the optical switch and corresponds to the optical wavelength corresponding to the memory 1, controls the optical switch to open the determined optical input end, and controls the optical switch to open an output end connected to the optical modulator 2, so that the optical switch outputs the optical wave of the wavelength corresponding to the memory 1 to the optical modulator 2.

Manner 2: a. The processor 2 searches for, according to the preset correspondence between a memory identifier and an optical wavelength, the wavelength corresponding to the memory 1, and sends a second control signal to a controller, where the second control signal carries the wavelength corresponding to the memory 1.

b. The controller determines, according to the received wavelength and according to a preset correspondence between an optical wavelength and an optical input end of the optical switch, an optical input end of the optical wave of the wavelength corresponding to the memory 1, controls the optical switch to open the determined optical input end, and controls the optical switch to open an output end connected to the optical modulator 2, so that the optical switch outputs the optical wave of the wavelength corresponding to the memory 1 to the optical modulator 2.

Manner 3: a. The processor 2 determines, according to the preset correspondence between a memory identifier and an optical wavelength, the wavelength corresponding to the memory 1; determines, according to a preset correspondence between an optical wavelength and an optical input end of the optical switch, an optical input end that is of the optical switch and corresponds to the wavelength corresponding to the memory 1; and sends a third control signal to a controller, where the third control signal carries an identifier of the determined optical input end.

b. The controller controls, according to the received identifier of the optical input end, the optical switch to open the optical input end; and controls the optical switch to open an output end connected to the optical modulator 2, so as to control the optical switch to transmit the optical wave of the wavelength corresponding to the memory 1 to the optical modulator 2.

Step 903: The optical modulator 2 receives the electrical signal sent by the processor 2, and receives the optical wave sent by the optical switch, where a wavelength of the optical wave is the wavelength corresponding to the memory 1, and the optical modulator 2 uses the electrical signal to modulate the received optical wave to generate an optical signal.

Step 904: The optical modulator 2 sends the generated optical signal to a demultiplexer of the data receiving apparatus using an optical transmission medium.

Step 905: The demultiplexer demultiplexes the optical signal, and sends, according to the preset correspondence between a memory identifier and an optical wavelength, a demultiplexed optical signal to an optical receiver 1 of the memory 1 corresponding to a wavelength of the demultiplexed optical signal.

Step 906: The optical receiver 1 receives and recovers the demultiplexed optical signal to obtain an electrical signal, and sends the electrical signal to the memory 1. So far, accessing the memory 1 by the processor 2 is completed.

It should be noted that one processor may correspond to multiple optical modulators. In this case, in step 901, the processor 2 separately sends electrical signals for accessing multiple memories to multiple optical modulators of the processor 2. Correspondingly, in step 902, the processor 2 controls the optical switch to output multiple wavelengths corresponding to the multiple memories to the foregoing multiple modulators, and outputs optical signals of the multiple wavelengths using the multiple optical modulators, so as to implement synchronous access to the multiple memories.

In another implementation manner, an optical receiver of a memory may process optical signals of multiple wavelengths. An example in which the optical receiver 1 of the memory 1 can process optical signals whose wavelengths are $\lambda_1$ and $\lambda_2$ is used for description. In this case, the processor 2 accesses the memory 1. In step 902, the processor 2 controls the optical switch to output optical waves whose wavelengths are $\lambda_1$ and $\lambda_2$ at the output end connected to the optical modulator 2. In step 903, the optical modulator 2 uses the optical waves whose wavelengths are $\lambda_1$ and $\lambda_2$ to modulate the electrical signal sent by the processor 2, adds the electrical signal to optical signals whose wavelengths are $\lambda_1$ and $\lambda_2$, and sends the optical signals to the demultiplexer of the data receiving apparatus. In step 905, according to the preset correspondence between a memory identifier and an optical wavelength, the demultiplexer determines that the optical signals whose wavelengths are $\lambda_1$ and $\lambda_2$ need to be sent to the optical receiver 1 of the memory 1. In step 906, the optical receiver 1 recovers the optical signals whose wavelengths are $\lambda_1$ and $\lambda_2$ to electrical signals, and sends the electrical signals to the memory 1. It should be noted that an existing manner may be used for adding, to two optical carriers whose wavelengths are $\lambda_1$ and $\lambda_2$, an electrical signal for accessing the memory 1. The present disclosure imposes no limitation thereto.

Because all optical signals of the data sending apparatus are transferred to the data receiving apparatus using the optical transmission medium, and the optical transmission medium always has ultra-high transmission bandwidth, bandwidth requirements of the processor and the memory can be met even if quantities of processors and memories increase, thereby ensuring a simple interconnection structure. Because the optical switch is directly connected to a light source in this embodiment of the present disclosure, and a modulated signal does not pass through the optical switch in a process of being transferred to a receive end, the modulated signal experiences less noise interference and has better link signal integrity.

Based on the foregoing descriptions of the implementation manners, a person skilled in the art may clearly understand that some or all steps of the methods in the foregoing embodiments may be implemented by software in addition to a necessary universal hardware platform. Based on such an understanding, the technical solutions of the present disclosure essentially or the part contributing to the prior art may be implemented in a form of a software product. The software product may be stored in a storage medium, such as a read-only memory (ROM)/random access memory (RAM), a magnetic disk, or an optical disc, and includes several instructions for instructing a computer device (which may be a personal computer, a resource management server, a network communications device such as a media gateway, or the like) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, a method embodiment is described in a simpler manner than device and system embodiments. For related parts, refer to descriptions in the device and system embodiments. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts. Any modification, equivalent replacement, or improvement made without departing from the spirit and principle of the present disclosure shall fall within the protection scope of the present disclosure.

What is claimed is:
1. A memory access system, comprising:
a data sending apparatus;
an optical transmission medium; and
a data receiving apparatus,
wherein the data sending apparatus comprises a signal generator, an optical switch, and an optical modulator,
wherein the data receiving apparatus comprises a demultiplexer, multiple memories, and optical receivers corresponding to the multiple memories in a one-to-one manner,
wherein an electrical input end of the optical switch is connected to the signal generator,
wherein an optical input end of the optical switch is connected to a multi-wavelength light source and receives an optical wave emitted by the multi-wavelength light source, wherein an output end of the optical switch is connected to an optical input end of the optical modulator, wherein the signal generator is connected to a signal input end of the optical modulator, wherein an input end of the demultiplexer of the data receiving apparatus is connected to the optical modulator of the data sending apparatus using the optical transmission medium, wherein an output end of the demultiplexer of the data receiving apparatus is connected to the optical receivers, wherein the signal generator is configured to:
   send an electrical signal to the optical modulator, wherein the electrical signal carries an access request for a target memory; and
   control, according to a preset correspondence between a memory identifier and an optical wavelength, the optical switch to output an optical wave of a wavelength corresponding to the target memory to the optical modulator;

wherein the optical modulator is configured to:
   receive the optical wave sent by the optical switch;
   receive the electrical signal input by the signal generator;
   use the electrical signal to modulate the optical wave so that the electrical signal is loaded to the optical wave to form an optical signal; and
   send, using the optical transmission medium, the optical signal to the data receiving apparatus in which the target memory is located, wherein the demultiplexer is configured to:
   receive the optical signal using the optical transmission medium; and
   send, according to the preset correspondence between a memory identifier and an optical wavelength, a demultiplexed optical signal to an optical receiver corresponding to the target memory, and wherein the optical receiver is configured to:
   convert the received optical signal into an electrical signal; and
   send the electrical signal to the target memory.

2. The system according to claim 1, wherein the signal generator comprises a processor and a controller, wherein the processor is separately connected to the optical modulator and the controller, wherein the controller is connected to the electrical input end of the optical switch,
   wherein the processor is configured to:
   send a first control signal to the controller, wherein the first control signal carries an identifier of the target memory that is to be accessed by the processor; and
   send the electrical signal to the optical modulator, and
   wherein the controller is configured to:
   receive the first control signal; determine, according to the preset correspondence between a memory identifier and an optical wavelength, the wavelength corresponding to the target memory; and
   control the optical switch to output the optical wave of the wavelength corresponding to the target memory to the optical modulator.

3. The system according to claim 2, wherein the controller is further configured to:
   determine, according to a preset correspondence between an optical wavelength and an optical input end of the optical switch, an optical input end of the optical wave of the wavelength corresponding to the target memory;
   control the optical switch to open the determined optical input end; and
   control the optical switch to open an output end connected to the optical modulator so that the optical switch outputs the optical wave of the wavelength corresponding to the target memory to the optical modulator.

4. The system according to claim 1, wherein the signal generator comprises a processor and a controller, wherein the processor is separately connected to the optical modulator and the controller, wherein the controller is connected to the electrical input end of the optical switch, wherein the processor is configured to:
   search for the wavelength corresponding to the target memory according to the preset correspondence between a memory identifier and an optical wavelength;
   send a second control signal to the controller, wherein the second control signal carries the wavelength corresponding to the target memory; and
   send the electrical signal to the optical modulator, and
   wherein the controller is configured to control, according to the received wavelength, the optical switch to output the optical wave of the wavelength corresponding to the target memory to the optical modulator.

5. The system according to claim 4, wherein the controller is further configured to:
   determine, according to a preset correspondence between an optical wavelength and an optical input end of the optical switch, an optical input end of the optical wave of the wavelength corresponding to the target memory;
   control the optical switch to open the determined optical input end; and
   control the optical switch to open an output end connected to the optical modulator so that the optical switch outputs the optical wave of the wavelength corresponding to the target memory to the optical modulator.

6. The system according to claim 1, wherein the signal generator comprises a processor and a controller, wherein the processor is separately connected to the optical modulator and the controller, wherein the controller is connected to the electrical input end of the optical switch, wherein the processor is further configured to:
   determine, according to the preset correspondence between a memory identifier and an optical wavelength, the wavelength corresponding to the target memory;
   determine, according to a preset correspondence between an optical wavelength and an optical input end of the optical switch, an optical input end that is of the optical switch and corresponds to the wavelength corresponding to the target memory; and
   send a third control signal to the controller, wherein the third control signal carries an identifier of the determined optical input end, and
   wherein the controller is configured to:
   control, according to the received identifier of the optical input end, the optical switch to open the optical input end; and
   control the optical switch to open an output end connected to the optical modulator so as to control the optical switch to transmit the optical wave of the wavelength corresponding to the target memory to the optical modulator.

7. The system according to claim 1, wherein the target memory corresponds to multiple optical wavelengths, and wherein the optical wavelengths correspond to optical input ends of the optical switch in a one-to-one manner.

8. The system according to claim 1, wherein the processor corresponds to multiple optical modulators, and wherein each optical modulator is connected to one output end of the optical switch.

9. The system according to claim 1, wherein the data sending apparatus further comprises a storage device, and wherein the storage device stores the preset correspondence between an optical wavelength and an optical input end of the optical switch and the preset correspondence between a memory identifier and an optical wavelength.

10. A data sending apparatus, wherein the data sending apparatus comprises:
- a signal generator;
- an optical switch; and
- an optical modulator,
- wherein the data sending apparatus accesses a memory of a data receiving apparatus using an optical transmission medium,
- wherein an electrical input end of the optical switch is connected to the signal generator,
- wherein an optical input end of the optical switch is connected to a multi-wavelength light source and receives an optical wave emitted by the multi-wavelength light source,
- wherein an output end of the optical switch is connected to an optical input end of the optical modulator,
- wherein the signal generator is connected to a signal input end of the optical modulator;
- wherein the signal generator is configured to:
  - send an electrical signal to the optical modulator, wherein the electrical signal carries an access request for a target memory; and
  - control, according to a preset correspondence between a memory identifier and an optical wavelength, the optical switch to output an optical wave of a wavelength corresponding to the target memory to the optical modulator, and
- wherein the optical modulator is configured to:
  - receive the optical wave sent by the optical switch;
  - receive the electrical signal input by the signal generator;
  - use the electrical signal to modulate the optical wave so that the electrical signal is loaded to the optical wave to form an optical signal; and
  - send, using the optical transmission medium, the optical signal to the data receiving apparatus in which the target memory is located.

11. The apparatus according to claim 10, wherein the signal generator comprises a processor and a controller, wherein the processor is separately connected to the optical modulator and the controller, wherein the controller is connected to the electrical input end of the optical switch, wherein the processor is configured to:
- send a first control signal to the controller, wherein the first control signal carries an identifier of the target memory that is to be accessed by the processor; and
- send the electrical signal to the optical modulator, and
- wherein the controller is configured to:
  - receive the first control signal;
  - determine, according to the preset correspondence between a memory identifier and an optical wavelength, the wavelength corresponding to the target memory; and
  - control the optical switch to output the optical wave of the wavelength corresponding to the target memory to the optical modulator.

12. The apparatus according to claim 11, wherein the controller is further configured to:
- determine, according to a preset correspondence between an optical wavelength and an optical input end of the optical switch, an optical input end of the optical wave of the wavelength corresponding to the target memory;
- control the optical switch to open the determined optical input end; and
- control the optical switch to open an output end connected to the optical modulator so that the optical switch outputs the optical wave of the wavelength corresponding to the target memory to the optical modulator.

13. The apparatus according to claim 10, wherein the signal generator comprises a processor and a controller, the processor is separately connected to the optical modulator and the controller, wherein the controller is connected to the electrical input end of the optical switch, wherein the processor is configured to:
- search for the wavelength corresponding to the target memory according to the preset correspondence between a memory identifier and an optical wavelength;
- send a second control signal to the controller, wherein the second control signal carries the wavelength corresponding to the target memory; and
- send the electrical signal to the optical modulator, and
- wherein the controller is configured to control, according to the received wavelength, the optical switch to output the optical wave of the wavelength corresponding to the target memory to the optical modulator.

14. The apparatus according to claim 13, wherein the controller is further configured to:
- determine, according to a preset correspondence between an optical wavelength and an optical input end of the optical switch, an optical input end of the optical wave of the wavelength corresponding to the target memory;
- control the optical switch to open the determined optical input end; and
- control the optical switch to open an output end connected to the optical modulator so that the optical switch outputs the optical wave of the wavelength corresponding to the target memory to the optical modulator.

15. A method for accessing a memory of a data receiving apparatus by a data sending apparatus, wherein the data sending apparatus comprises a signal generator, an optical switch, and an optical modulator; and wherein the method comprises:
- sending, by the signal generator, an electrical signal to the optical modulator, wherein the electrical signal carries an access request for a target memory;
- receiving, by the optical switch, an optical wave emitted by a multi-wavelength light source;
- controlling, by the signal generator according to a preset correspondence between a memory identifier and an optical wavelength, the optical switch to output an optical wave of a wavelength corresponding to the target memory to the optical modulator; and
- receiving, by the optical modulator, the optical wave sent by the optical switch, receiving the electrical signal input by the signal generator;
- using the electrical signal to modulate the optical wave so that the electrical signal is loaded to the optical wave to form an optical signal; and
- sending, using an optical transmission medium, the optical signal to the data receiving apparatus in which the target memory is located.

16. The method according to claim 15, wherein the signal generator comprises a processor and a controller, wherein sending the electrical signal to the optical modulator comprises sending, by the processor, the electrical signal to the optical modulator, and wherein controlling the optical switch to output the optical wave of the wavelength corresponding to the target memory to the optical modulator comprises:
- sending, by the processor, a first control signal to the controller, wherein the first control signal carries an identifier of the target memory that is to be accessed by the processor;
- receiving, by the controller, the first control signal;
- determining, according to the preset correspondence between a memory identifier and an optical wavelength, the wavelength corresponding to the target memory; and
- controlling the optical switch to output the optical wave of the wavelength corresponding to the target memory to the optical modulator.

17. The method according to claim 16, wherein controlling the optical switch to output the optical wave of the wavelength corresponding to the target memory to the optical modulator comprises:
- determining, by the controller according to a preset correspondence between an optical wavelength and an optical input end of the optical switch, an optical input end of the optical wave of the wavelength corresponding to the target memory;
- controlling the optical switch to open the determined optical input end; and
- controlling the optical switch to open an output end connected to the optical modulator so that the optical switch outputs the optical wave of the wavelength corresponding to the target memory to the optical modulator.

18. The method according to claim 15, wherein the signal generator comprises a processor and a controller, wherein sending the electrical signal to the optical modulator comprises sending, by the processor, the electrical signal to the optical modulator, and wherein controlling the optical switch to output an optical wave of a wavelength corresponding to the target memory to the optical modulator comprises:
- searching, by the processor, for the wavelength corresponding to the target memory according to the preset correspondence between a memory identifier and an optical wavelength; and
- sending a second control signal to the controller, wherein the second control signal carries the wavelength corresponding to the target memory; and
- controlling, by the controller according to the received wavelength, the optical switch to output the optical wave of the wavelength corresponding to the target memory to the optical modulator.

19. The method according to claim 18, wherein controlling the optical switch to output the optical wave of the wavelength corresponding to the target memory to the optical modulator comprises:
- determining, by the controller according to a preset correspondence between an optical wavelength and an optical input end of the optical switch, an optical input end of the optical wave of the wavelength corresponding to the target memory;
- controlling the optical switch to open the determined optical input end; and
- controlling the optical switch to open an output end connected to the optical modulator so that the optical switch outputs the optical wave of the wavelength corresponding to the target memory to the optical modulator.

20. The method according to claim 15, wherein the signal generator comprises a processor and a controller, wherein the processor is separately connected to the optical modulator and the controller, wherein the controller is connected to the electrical input end of the optical switch, wherein the controlling, by the signal generator according to a preset correspondence between a memory identifier and an optical wavelength, the optical switch to output an optical wave of a wavelength corresponding to the target memory to the optical modulator further comprises:
- determining, by the processor according to the preset correspondence between a memory identifier and an optical wavelength, the wavelength corresponding to the target memory;
- determining, according to a preset correspondence between an optical wavelength and an optical input end of the optical switch, an optical input end that is of the optical switch and corresponds to the wavelength corresponding to the target memory;
- sending a third control signal to the controller, wherein the third control signal carries an identifier of the determined optical input end;
- controlling, by the controller according to the received identifier of the optical input end, the optical switch to open the optical input end; and
- controlling the optical switch to open an output end connected to the optical modulator, so as to control the optical switch to transmit the optical wave of the wavelength corresponding to the target memory to the optical modulator.

21. The method according to claim 15, wherein the data receiving apparatus comprises a demultiplexer, multiple memories, and optical receivers corresponding to the multiple memories in a one-to-one manner, and wherein the method further comprises:
- receiving, by the demultiplexer using the optical transmission medium, an optical signal sent by the data sending apparatus, wherein the optical signal is used to access a target memory in the multiple memories;
- demultiplexing the optical signal; and
- sending, according to the preset correspondence between a memory identifier and an optical wavelength, a demultiplexed optical signal to an optical receiver of a target memory corresponding to a wavelength of the demultiplexed optical signal; and
- receiving and recovering, by the optical receiver, the demultiplexed optical signal to obtain an electrical signal, and sending the electrical signal to the target memory.

* * * * *